United States Patent
Ikram et al.

(10) Patent No.: US 11,921,229 B2
(45) Date of Patent: Mar. 5, 2024

(54) DISTANCE MEASUREMENT USING MILLIMETER WAVE RADAR

(71) Applicant: TEXAS INSTRUMENTS INCORPORATED, Dallas, TX (US)

(72) Inventors: Muhammad Zubair Ikram, Richardson, TX (US); Adeel Ahmad, Plano, TX (US); Dan Wang, Allen, TX (US); Murtaza Ali, Cedar Park, TX (US)

(73) Assignee: Texas Instruments Incorporated, Dallas, TX (US)

(*) Notice: Subject to any disclaimer, the term of this patent is extended or adjusted under 35 U.S.C. 154(b) by 78 days.

(21) Appl. No.: 17/479,002

(22) Filed: Sep. 20, 2021

(65) Prior Publication Data

US 2022/0206109 A1 Jun. 30, 2022

Related U.S. Application Data

(63) Continuation of application No. 16/201,726, filed on Nov. 27, 2018, now Pat. No. 11,125,856.

(60) Provisional application No. 62/591,450, filed on Nov. 28, 2017.

(51) Int. Cl.
G01S 13/44 (2006.01)
G01S 7/35 (2006.01)
G01S 13/34 (2006.01)
G01S 13/931 (2020.01)

(52) U.S. Cl.
CPC .......... G01S 7/352 (2013.01); G01S 13/34 (2013.01); G01S 13/343 (2013.01); G01S 13/931 (2013.01)

(58) Field of Classification Search
CPC .......... G01S 13/325; G01S 13/4409; G01S 13/4436; G01S 13/4454; G01S 13/449; G01S 13/878; G01S 7/032; G01S 7/282; G01S 7/288; G01S 7/41; G01S 13/584;
(Continued)

(56) References Cited

U.S. PATENT DOCUMENTS

2015/0198708 A1* 7/2015 Khan .................... G01S 13/878
342/146
2016/0202347 A1* 7/2016 Malinovskiy ........... G01S 13/88
342/124

OTHER PUBLICATIONS

Muhammad Z. Ikram, Adeel Ahmad and Dan Wang, "High-Accuracy Distance Measurement Using Millimeter-Wave Radar." IEEE Radar Conference, 2018. IEEE 978-1-5386-4167-5/18; pp. 1296-1300.

* cited by examiner

Primary Examiner — Timothy A Brainard
(74) Attorney, Agent, or Firm — Michael T. Gabrik; Frank D. Cimino

(57) ABSTRACT

An apparatus, including processing unit (PU) cores and computer readable storage devices storing machine instructions for determining a distance between a target object and a radar sensor circuit. The PU cores receive a beat signal generated by the radar sensor circuit and compensate for a phase difference between the received beat signal and a reconstruction of the received beat signal to obtain a phase compensated beat signal. The phase compensated beat signal is then filtered to remove spurious reflections by demodulating the phase compensated beat signal using an estimated frequency of the phase compensated beat signal. The PU cores then apply a low pass filter to the demodulated phase compensated beat signal, resulting in a modified beat signal. The PU cores then determine the distance between the target object and the radar sensor circuit using the modified beat signal.

20 Claims, 6 Drawing Sheets

(58) Field of Classification Search
CPC ... G01S 2013/0254; G01S 7/2883; G01S 7/42
See application file for complete search history.

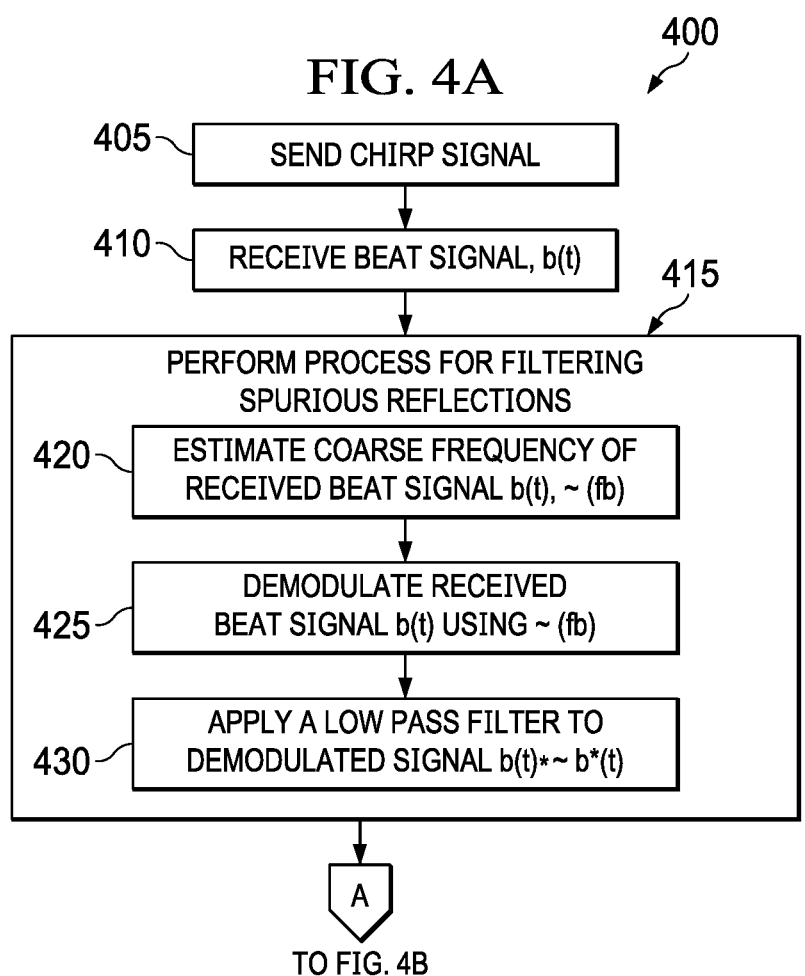

DISTANCE MEASUREMENT USING MILLIMETER WAVE RADAR

RELATED APPLICATIONS

This application is a continuation of U.S. patent application Ser. No. 16/201,726 filed Nov. 27, 2018, which claims priority to U.S. Provisional Application No. 62/591,450, filed Nov. 28, 2017 each of which is incorporated by reference herein in its entirety.

BACKGROUND

Millimeter wave radar systems are used to measure the distance between the system and a target object. To do this, the radar system transmits a concentrated radio wave, called a chirp signal, and listens for any reflections. If there is an object in the path of the chirp signal, it will reflect some of the electromagnetic energy back to the radar device. Radio signals move through the air at a constant speed, so the radar system can calculate how far away the object is based on how long it takes the radio signal to return. However, the radio signal bounced back to the radio device may include reflections from more than just the target object. Spurious reflections refer to radio frequency (RF) reflections off non-target objects, objects which are uninteresting to the radar system (i.e., not the object to which distance to be measured is desired). These non-target objects can include nearby objects or natural objects such as, for example, the ground, pavement, puddles, precipitation (such as rain, snow, or hail), blowing sand or dust, atmospheric turbulence, other atmospheric effects, etc.

Some radar systems experience a phase shift between down converted received radio signals, called beat signals, and the radar systems' reconstruction of the beat signals from the signal samples. This phase difference is likely due to phase differences between the intended chirp signal and the actual transmitted chirp signal, which carries through all signal calculations, introducing error in the phase calculations and by extension, the distance measurement. Some radar systems compensate for the phase difference between the beat signal received by the radar systems and the beat signal reconstructed by the radar systems from the signal samples by demodulating the received beat signal using an estimated frequency of the received beat signal. The amplitude of the demodulated beat signal at time zero eliminates the signal contribution due to frequency and estimates the signal contribution due to the phase difference between the received and reconstructed beat signals alone. The amplitude of the demodulated beat signal at time zero is then used to demodulate subsequent received beat signals and remove the signal contribution due to this phase difference before calculation of the distance between the radar system and the target object, improving the accuracy of the determined distance. Some radar systems remove spurious reflections from the received beat signal by estimating the frequency of the received beat signal. The estimated frequency is used to demodulate the received beat signal, which is then low pass filtered to remove spurious reflections. The resulting modified beat signal includes only reflections off the target object and allows highly accurate determinations of distance between the radar system and the target object.

SUMMARY

In some examples, an apparatus includes one or more central processing unit (CPU) cores and one or more computer-readable storage devices storing machine instructions to determine a distance between a target object and a radar sensor circuit. The machine instructions prompt the CPU cores to receive a beat signal generated by the radar sensor circuit and compensate for a phase difference between the received beat signal and a reconstruction of the received beat signal, resulting in a phase compensated beat signal. The CPU cores then filter spurious reflections from the phase compensated beat signal by demodulating the phase compensated beat signal using an estimated coarse frequency of the phase compensated beat signal, and applying a low pass filter to the demodulated phase compensated beat signal to obtain a modified beat signal. The machine instructions then prompt the CPU cores to determine the distance between the target object and the radar sensor circuit using the modified beat signal. Oftentimes the CPU cores cannot perfectly reconstruct the received beat signal due to limitations in signal sampling, chirp signal transmission, and the like, which may result in a phase difference between the received beat signal and the CPU cores' reconstruction of the received beat signal. In some examples, the machine instructions cause the CPU cores to compensate for the phase difference between the received beat signal and the reconstruction of the received beat signal by demodulating the received beat signal using an estimated phase difference. The CPU cores estimate the phase difference by demodulating the received beat signal using an estimated coarse phase and estimated coarse frequency of the received beat signal to obtain a phase compensation signal and using the value of the phase compensation signal at a time zero as the estimated phase difference. In some examples, the apparatus also includes the radar sensor circuit, and is implemented on a vehicle.

BRIEF DESCRIPTION OF THE DRAWINGS

For a detailed description of various examples, reference will now be made to the accompanying drawings in which:

FIGS. 4A-B illustrate, in flow chart form, an example method for calculating the distance between a radar system and target object.

DETAILED DESCRIPTION

Figure 1:
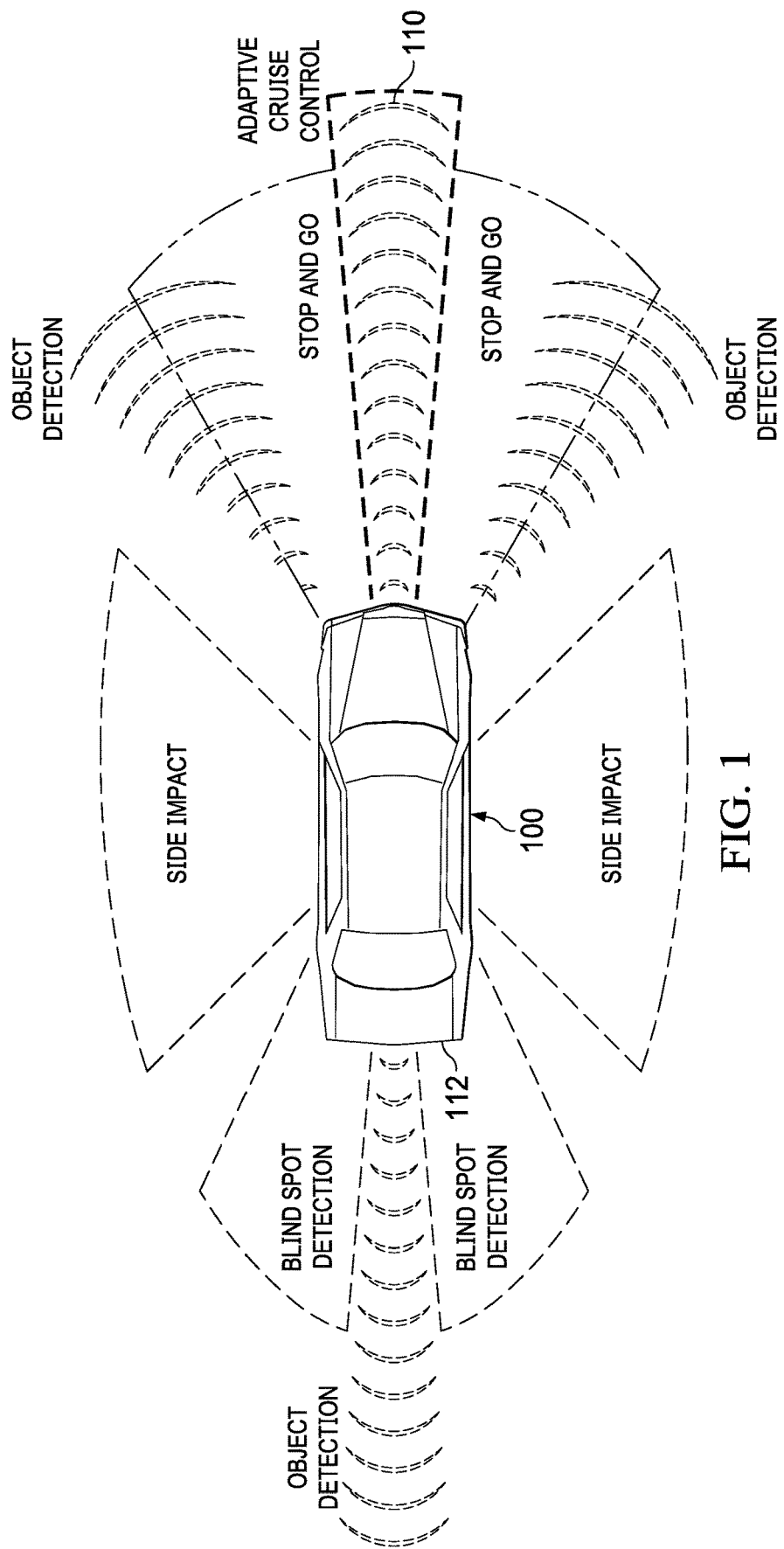
FIG. 1 is an illustration of an automobile equipped with multiple radar systems for distance determination in accordance with one example.

For at least some radar systems, spurious reflections of the transmitted chirp signal off non-target objects, objects other than the target object, and a phase difference between received and reconstructed beat signals introduce error to determinations of distance using the radar systems. The described examples pertain to a circuit (e.g., an integrated circuit (IC)) for a millimeter wave radar system for measuring distances with high accuracy. The radar system in the disclosed examples allows the distance between the system and other objects to be measured with greater accuracy than other systems for measuring distance, which in turn allows the radar system to be used in industrial, research, and vehicular applications and the like requiring high accuracy distance measurements. In some examples, the disclosed millimeter wave radar system is smaller than other available high accuracy distance measurement systems, giving it more versatility than the larger systems.

The illustrative millimeter wave radar system includes a radar sensor circuit, a central processing unit (CPU) core, storage, and a display. The term "CPU core" (singular) is used herein to refer to either a single or multiple CPU cores, and to broadly describe central processing units, digital signal processors, application specific integrated circuits, and the like. The radar sensor circuit outputs chirp signals and receives reflections off target and non-target objects. The radar sensor circuit then creates beat signals by down converting the received reflections with the chirp signal, which it provides to the CPU core and storage as appropriate. The CPU core analyzes the received beat signals and compensates for the phase difference between the received and reconstructed beat signals using an estimate of the phase difference. The CPU core estimates the coarse frequency of the received beat signal and demodulates the received beat signal using the estimated coarse frequency, resulting in a phase compensation signal. The phase difference is estimated as the value of the phase compensation signal at time zero. The CPU core then demodulates the received beat signal using the estimated phase difference, resulting in a phase compensated beat signal. To filter spurious reflections from the phase compensated beat signal, the CPU core estimates the coarse frequency of the phase compensated beat signal and demodulates the phase compensated beat signal using the estimated coarse frequency. The CPU core then applies a low pass filter to the resulting demodulated phase compensated beat signal to remove spurious reflections from non-target objects, resulting in a modified beat signal. Next, the CPU core determines an improved distance between the system and the target object using the modified beat signal, resulting in a high accuracy distance measurement based on a phase compensated beat signal substantially free from spurious reflections off non-target objects. The high accuracy distance measurement can be shown on the display or provided to other systems.

One example use of the disclosed principles is for an automobile. FIG. 1 is an illustration of an automobile 100 that is equipped with multiple radar systems 110, 112 for distance determination. High resolution 77 GHz automotive radar systems have been developed to improve driving comfort and safety by measuring the distance from the vehicle to surrounding objects. These distances may be used to instruct a central controller to react appropriately in various driving scenarios, such as parking assistance or collision avoidance. Some vehicles may have a single radar system 110 that may be used for tasks such as adaptive cruise control, object warning, automatic braking, etc., for example. Some vehicles may have several radar systems, e.g., one in front 110 and one in back 112. Some vehicles may have several systems in front, several systems in back, and systems on the left and right side. For example, a vehicle may have three systems in front in which one faces straight ahead and the other two are angled to the left and right, three in back in which one faces straight back and two are angled to the left and right, and one on the left side and one on the right side, as shown in FIG. 1.

FIG. 1 illustrates a radar system used for purposes of automotive driving assistance, but radar systems can be used for industrial purposes as well, such as supply management, quality control, machine operation, and the like. For example, a millimeter wave radar system can be used to measure the height of stacks of paper or the diameter of spooled wire, which is then used to determine the quantity available for a manufacturing process. In a hydraulic applications example, such as heavy construction equipment making use of hydraulic pistons, the millimeter wave radar system determines the position of the hydraulic piston and fluid level within the piston, and assists in its control. In a quality control and manufacturing applications example, such as computer hardware manufacture and dental and orthodontic appliance manufacture where high precision is required, the radar system determines the thickness or smoothness of manufactured components and prompts adjustments to the manufacturing process where the determined thickness or smoothness is unacceptable for the resulting product.

In order to determine the distance from the radar system to a target object, e.g., for parking assistance or quality control in manufactured products, a signal received from the radar system front end is usually processed via a flow of signal processing steps. Unfortunately, spurious reflections and the phase difference between received and reconstructed beat signals may introduce error in distance determination for a particular target object. For example, where the radar system is used to measure the thickness of a manufactured component, error from spurious reflections can indicate the component does not meet the necessary specifications when it in fact does.

Figure 2:
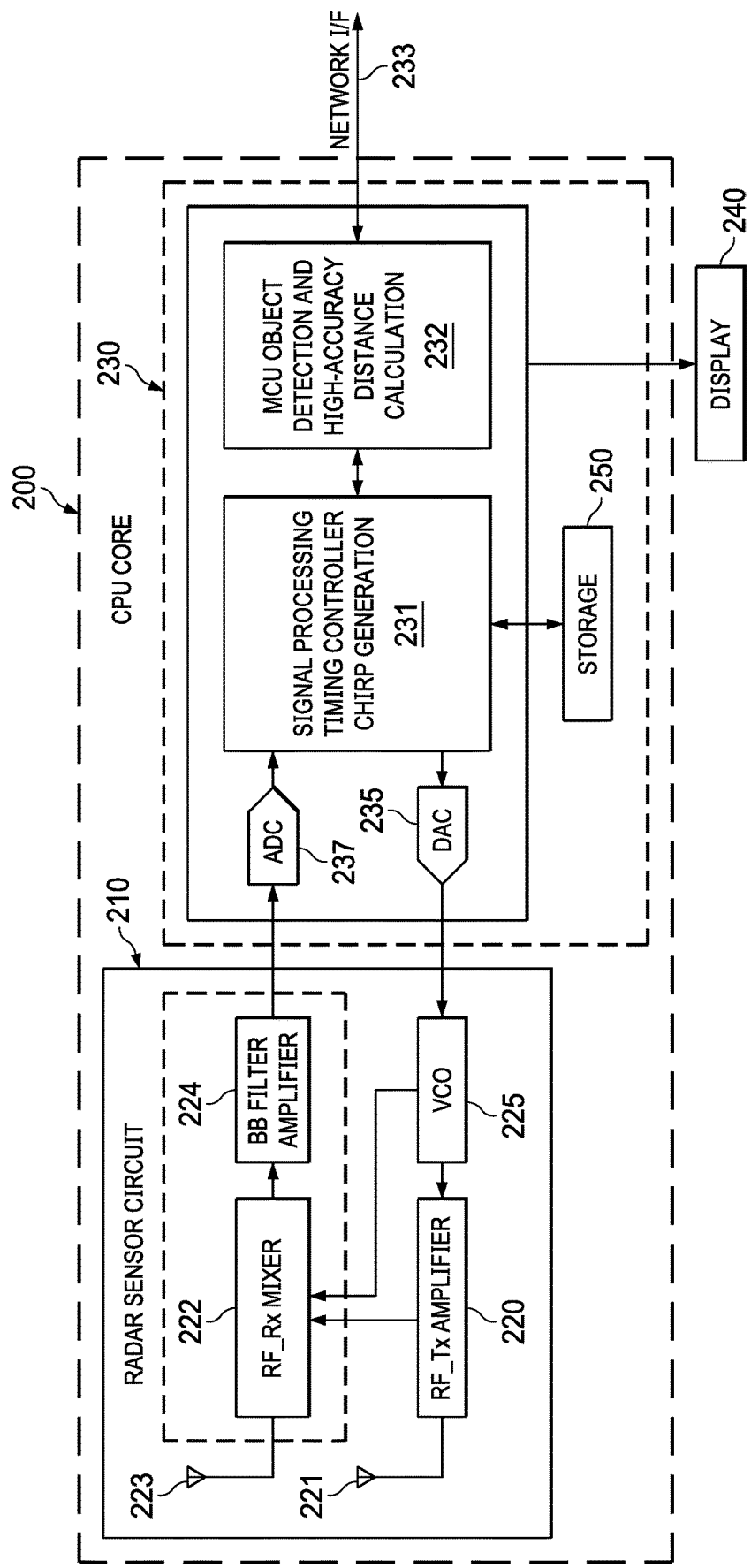
FIG. 2 is a block diagram of an example radar system in accordance with one example.

FIG. 2 is a block diagram of an example radar system 200. Radar system 200 may be used in a vehicle, such as automobile 100 of FIG. 1, or in industrial applications. In this example, radar system 200 includes a radar sensor circuit 210, a CPU core 230, a display 240, and storage 250. Radar sensor circuit 210 includes a transmitter 220 that drives an antenna 221. In this example radar system, transmitter 220 drives only a single antenna, but in other examples, transmitter 220 drives an array of one or more antennas. A receiver 222 receives signals from an antenna 223. In this example radar system, receiver 222 receives signals from only a single antenna, but in other examples, receiver 222 receives signals from an array of one or more antennas. A baseband module 224 amplifies and filters the received signals that are reflected from objects in the path of the transmitted chirp signals. In this example radar system, transmitter 220 operates in the 77 GHz region and produces a frequency modulated continuous wave (FMCW) signal. The continuous wave signal is frequency modulated to form a series of chirps using a voltage controller oscillator (VCO) 225. In example radar system 200, the transmit antenna 221 and receive antenna 223 are stationary. In other examples, the antennas may be configured to transmit and receive across a range of area, such as by mechanical movement.

Frequency modulated continuous wave radar (FMCW), also referred to as continuous-wave frequency-modulated (CWFM) radar, is a short-range measuring radar set capable of determining distance. In a FMCW system, the transmitted chirp signal of a known stable frequency continuous wave varies up and down in frequency over a fixed period of time by a modulating signal. Frequency difference between the received reflections and the transmitted chirp signal increases with delay and is therefore proportional to distance. Received reflections are then mixed with the transmitted chirp signal to produce a received beat signal, which will give the distance of the target object from the radar system after signal processing. During normal operation, linear frequency chirps are transmitted and reflected signals are received. The receiver and transmitter are arranged as a homodyne system so that the received reflections are down-converted directly into the baseband in mixer section 222 using a copy of the transmitted signal from VCO 225. The baseband signals are then filtered and amplified by filters and variable gain amplifiers 224. After converting the baseband signals into the digital domain, Fast Fourier Transforms (FFT) may be applied in order to determine the distance between the target object and the radar system 200.

CPU core 230 comprises one or more CPU cores, digital signal processors, application specific integrated circuits, and the like, as described previously. CPU core 230 includes a signal processing timing controller chirp generation circuit 231 that receives a stream of data from receiver antenna 223 via an analog to digital converter (ADC) 237 and performs chirp generation and control of the transmitter via a digital to analog converter (DAC) 235. A varying voltage tuning control signal from DAC 235 is used to control VCO 225. Storage 250 may be used to store instructions and data received from antenna 223. Storage 250 may be any appropriate storage medium, such as a static random access memory (SRAM). CPU core 230 also includes a microprocessor control unit (MCU) 232 that may perform signal processing for distance determination and display distance determinations on display 240 and/or communicate with other systems via a network interface 233. Network 233 may be an internet or other known or later developed wired or wireless communication mechanism, for example. A process for distance determination by MCU 232 will be described in more detail below in FIGS. 4 and 6.

Figure 3A:
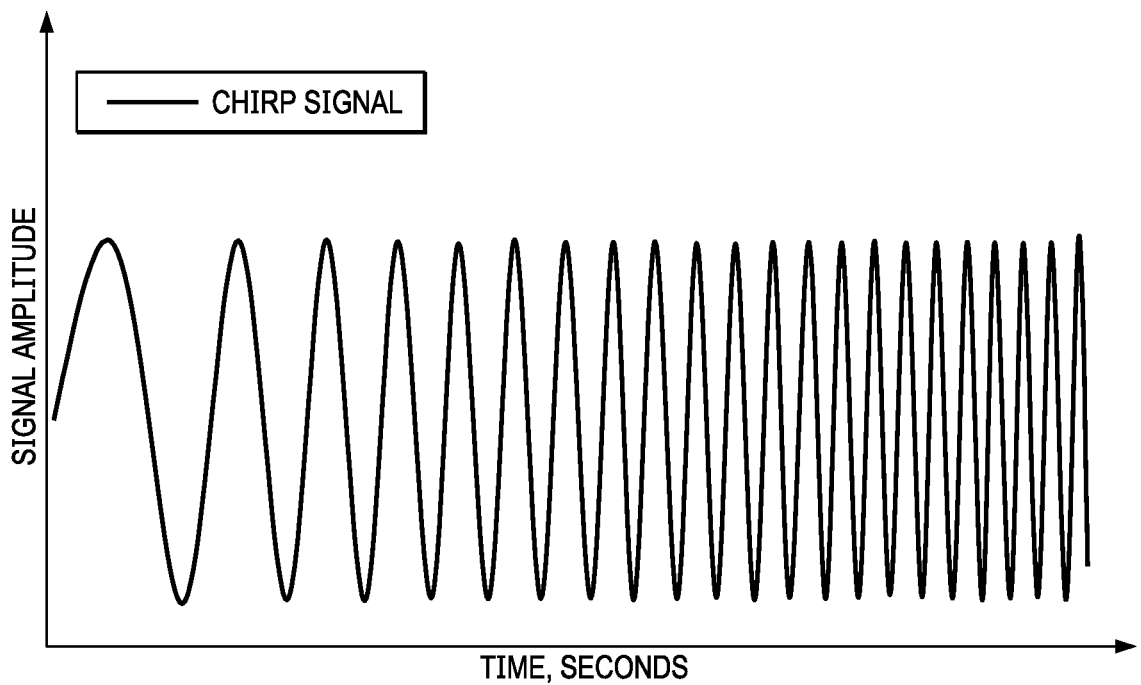
FIGS. 3A-B illustrate an example frequency modulated chirp signal for use in frequency modulated continuous wave radar.
Figure 3B:
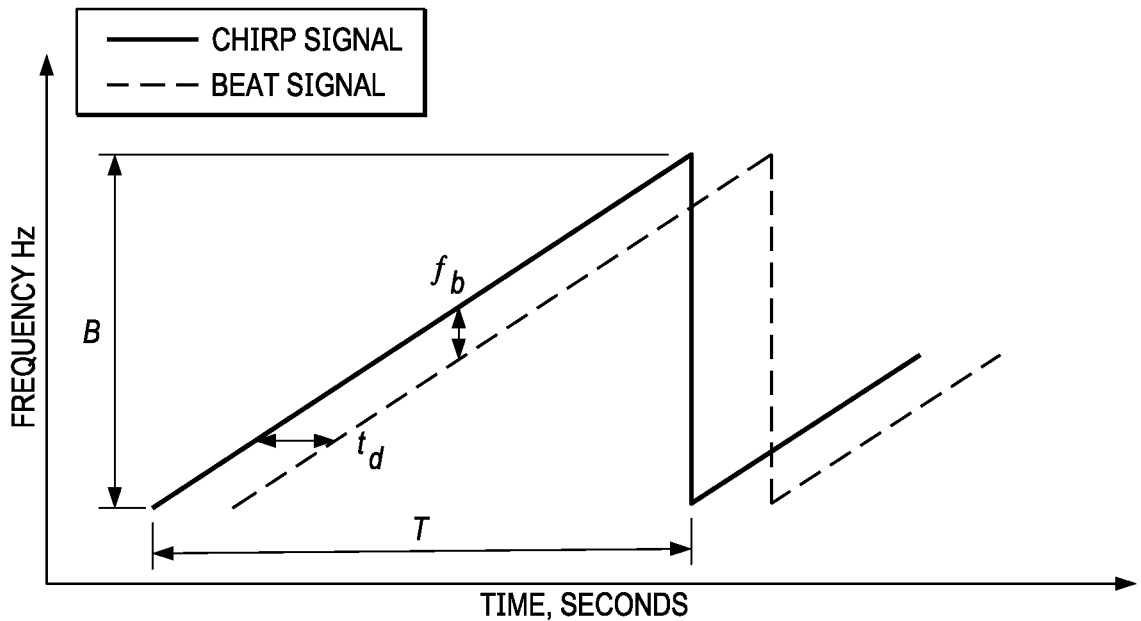

FIGS. 3A-B illustrate an example frequency modulated chirp signal for use in FMCW radar, according to one example. FIG. 3A shows the changing frequency of the example chirp signal in a graph of amplitude of the chirp signal over time. FIG. 3B illustrates the changing frequency of the chirp signal in a graph of frequency of the chirp signal over time. FIG. 3B also shows an example beat signal associated with reflections of the example chirp signal off a target object. An example radar system receives reflections of the example chirp signal off a target object and mixes them with the transmitted chirp signal to obtain the example beat signal. As FIG. 3B shows, the example beat signal has a time and frequency delay compared to the transmitted chirp signal. These time and frequency delays can be used to determine a distance between the example radar system and the target object. In many real-world applications of a radar system, the transmitted chirp signal reflects off of non-target objects as well as the target object, and the received reflections off non-target objects, called spurious reflections, introduce error to the calculation of distance between the radar system and the target object.

Figure 4B:
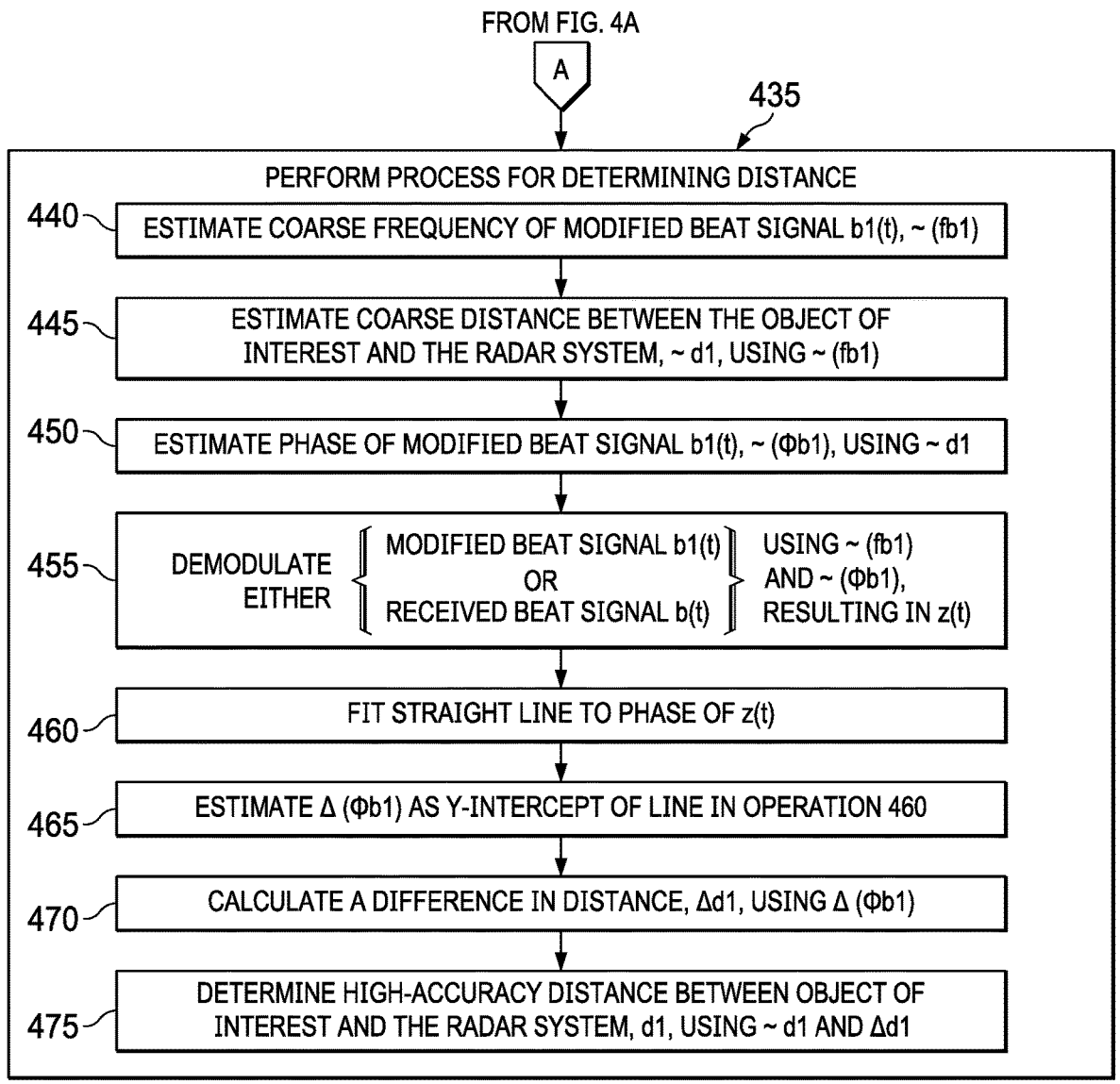

FIGS. 4A-B illustrate, in flow chart form, an example method 400 for calculating the distance between a radar system and a target object. The flow chart begins in FIG. 4A at operation 405, where the radar system transmits a chirp signal, e.g., the example chirp signal described herein with reference to FIGS. 3A-B. At operation 410, the system receives reflections of the transmitted chirp signal off the target object and spurious reflections of the transmitted chirp signal off one or more non-target objects. Both the reflections off the target object and the spurious reflections are mixed with the transmitted chirp signal to obtain a received beat signal, b(t). The received beat signal b(t) is represented as:

$$b(t) = e^{j\left[4\pi \frac{Bd1}{cT}t + 4\pi \frac{Bdx}{cT}t + 4\pi(fc)\frac{d1}{c} + 4\pi(fc)\frac{dx}{c}\right]}$$

where B represents the bandwidth in Hz of each chirp in the transmitted chirp signal, T represents the time duration of each chirp in the transmitted chirp signal, c is the speed of light, d1 represents the distance between the millimeter wave radar system and the target object, dx represents the distance between the millimeter wave radar system and one or more non-target objects, and (fc) represents the carrier frequency of the transmitted chirp signal. The frequency of the portion of the received beat signal b(t) due to reflections off the target object, (fb1), is represented as:

$$(fb1) = 4\pi\left(\frac{Bd1}{cT}\right)$$

The phase of the portion of the received beat signal b(t) due to reflections off the target object, ($\phi$b1), is represented as:

$$(\phi b1) = 4\pi(fc)\left(\frac{d1}{c}\right)$$

Similarly, the frequency of the portion of the received beat signal b(t) due to spurious reflections, (fbx), is represented as:

$$(fbx) = 4\pi\left(\frac{Bdx}{cT}\right)$$

The phase of the portion of the received beat signal b(t) due to spurious reflections, ($\phi$bx), is represented as:

$$(\phi bx) = 4\pi(fc)\left(\frac{dx}{c}\right)$$

The received beat signal b(t) can be simplified to:

$$b(t) = e^{j[(fb1)t + (fbx)t + (\phi b1) + (\phi bx)]}$$

Operation 415 performs a process for filtering spurious reflections out of the received beat signal b(t). Operation 415 and the process for filtering spurious reflections includes operations 420, 425, and 430. Operation 420 estimates the coarse frequency of the received beat signal b(t), ~(fb), using an FFT. The FFT converts the received beat signal b(t) to a representation in the frequency domain, allowing estimation of the coarse frequency ~(fb). This coarse frequency ~(fb) represents the frequency of the received beat signal as whole, without distinguishing between the reflections off the target object and the spurious reflections:

$$b(t) = e^{j[(fb)t + (\phi b)]}$$

Operation 425 demodulates the received beat signal b(t) using the coarse frequency ~(fb):

$$b(t)* \sim b*(t) = e^{j[(fb1)t + (fbx)t + (\phi b1) + (\phi bx)]} \cdot e^{j[-(fb)t]}$$

$$b(t)* \sim b*(t) = e^{j\{[(fb1)-(\sim fb))]t + [(fbx)-(\sim (fb))]t + (\phi b1) + (\phi bx)\}}$$

Because [(fb1)−(~(fb))] is much smaller than [(fbx)−(~(fb))], a low pass filter is applied to the demodulated signal b(t)*~b*(t) during operation 430, to remove the portion of the received beat signal due to spurious reflections. An appropriate low pass filter is selected based on the FFT size used to estimate ~(fb). For example, where the FFT size is 1024 and the sampling rate of the receiving antenna in the radar system is 8192 samples per second, the resolution for each spectral line in the FFT will be 8 Hz. Thus, a low pass filter is selected with a cutoff frequency of 20 Hz, allowing the portion of the demodulated beat signal due to [(fb1)−(~(fb))] to pass while blocking the portion of the demodulated beat signal due to spurious reflections. The resulting filtered and demodulated beat signal includes reflections of the transmitted chirp signal off of the target object, substantially free from spurious reflections off non-target objects, and is represented as:

$$y(t) = LPF[b(t) * \sim b*(t)]$$

The modified beat signal b1(t) is reconstructed from y(t) by modulating it using ~(fb):

$$b1(t) = y(t) * e^{j[\sim(fb)t]}$$

Operation 435 in FIG. 4B performs a process for determining the distance between the radar system and the target object. Operation 435 and the process for determining the distance includes operations 440-475. Operation 440 estimates the frequency of the modified beat signal b1(t), ~(fb1). In some examples, the coarse frequency ~(fb1) is estimated using an FFT and the modified beat signal b1(t). A zoom FFT can be used for greater accuracy. In other examples, the coarse frequency ~(fb1) is estimated by determining a difference in frequency Δ(fb) from filtered and demodulated beat signal y(t) using an FFT. The difference in frequency Δ(fb) is then added to the coarse frequency of the received beat signal b(t), ~(fb), estimated in operation 420, resulting in the coarse frequency ~(fb1):

$$\sim(fb1) = \sim(fb) + \Delta(fb)$$

Operation 445 uses the coarse frequency ~(fb1) to estimate a coarse distance between the target object and the radar system, ~d1. The coarse distance ~d1 is calculated as:

$$\sim d1 = \frac{[\sim(fb1)]cT}{4\pi B}$$

At operation 450, the coarse phase of the modified beat signal b1(t), ~(ϕb1), is determined using the coarse distance ~d1. The coarse phase ~(ϕb1) is determined as:

$$\sim(\phi b1) = 4\pi(fc)\left(\frac{\sim d1}{c}\right)$$

In some examples, operation 455 demodulates the modified beat signal b1(t) using the coarse frequency ~(fb1) and the coarse phase ~(ϕb1):

$$z(t) = b1(t) * \sim[b1*(t)] = e^{j[(fb1)t + (\phi b1)]} \cdot e^{-j[\sim(fb1)t + \sim(\phi b1)]}$$

$$z(t) = e^{j[\Delta(fb1)t + \Delta(\phi b1)]}$$

In other examples, operation 455 demodulates the received beat signal b(t) using the coarse frequency ~(fb1) and the coarse phase ~(ϕb1), which results in z(t). A straight line is fit to the phase of z(t) at operation 460 and Δ(ϕb1) is determined to be the y-intercept of that line in operation 465. Whether operation 455 demodulates the modified beat signal b1(t) or the received beat signal b(t), the improved frequency estimate of ~(fb1) over ~(fb) removes the time-varying component of the beat signal due to spurious reflections and allows better estimation of Δ(ϕb1). A difference in distance Δd1 is determined in operation 470 using Δ(ϕb1), and is represented as:

$$\Delta d1 = \frac{c\Delta(\phi b1)}{4\pi(fc)}$$

At operation 475, the distance between the target object and the radar system, d1, is determined using the improved coarse distance ~d1 from the frequency of the modified beat signal b1(t) and the difference in distance Δd1 from the phase of the modified beat signal b1(t). As stated before, the modified beat signal b1(t) includes only the reflections of the transmitted chirp signal off of the target object; the influence of spurious reflections off non-target objects is largely removed, allowing a more accurate calculation of the frequency and phase, and by extension, the distance between the target object and the radar system. The distance between the target object and the radar system d1 is represented as:

$$d1 = \sim d1 + \Delta d1$$

Figure 5:
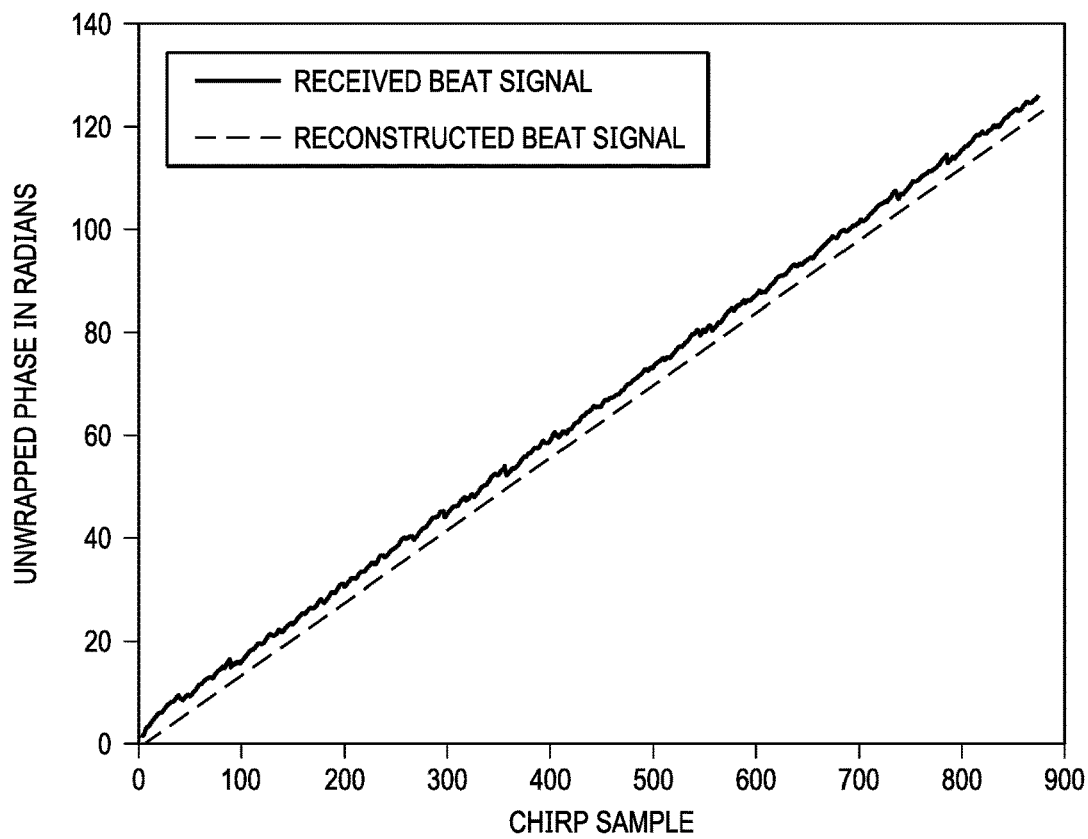
FIG. 5 illustrates an example phase difference between example received and reconstructed beat signals.

FIG. 5 illustrates an example phase difference between example received and reconstructed beat signals. This phase difference can be caused by differences between the intended chirp signal and the transmitted chirp signal, limitations in signal sampling, and the like, and carries through all signal calculations, introducing error in the phase calculations and by extension, the distance measurement. To illustrate, consider the modified beat signal b1(t). The modified beat signal b1(t) includes no or very few spurious reflections off non-target objects, largely just the beat signal from reflections of the transmitted chirp signal off the target object. However, the modified beat signal b1(t) is still influenced by a phase difference (ϕc):

$$b1(t) = e^{j\left[4\pi \frac{Bd1}{cT}t + 4\pi(fc)\frac{d1}{c} + (\phi c)\right]}$$

Thus, a radar system performing operation 435 described in FIG. 4 demodulates the modified beat signal b1(t) using the coarse frequency ~(fb1) and the coarse phase ~(ϕb1) in operation 455. However, the reconstructed beat signal ~b1(t) does not account for the phase difference (ϕc):

$$\sim b1(t) = e^{j\left[4\pi \frac{B(\sim d1)}{cT}t + 4\pi(fc)\frac{(\sim d1)}{c}\right]}$$

This in turn leaves the influence of phase difference (ϕc) in the resulting z(t):

$$z(t) = b1(t) * \sim[b1*(t)] = e^{j\left[4\pi \frac{B[d1-(\sim d1)]}{cT}t + 4\pi(fc)\frac{[d1-(\sim d1)]}{c} + (\phi c)\right]}$$

$$z(t) = e^{j\left[4\pi \frac{B[d1-(\sim d1)]}{cT}t + \frac{4\pi}{\lambda}[d1-(\sim d1)] + (\phi c)\right]}$$

where λ represents the wavelength of the transmitted chirp signal. Operation 465 then uses the signal z(t) to determine the phase difference Δ(ϕb1), which is represented by:

$$\Delta(\phi b1) = \frac{4\pi(fc)}{c}(\Delta d1) + (\phi c)$$

When phase difference ($\phi c$) is left in signal z(t), an error is introduced in the phase difference $\Delta(\phi b1)$ and the calculation of the distance difference $\Delta d1$, such that while the distance difference $\Delta d1$ is actually represented as:

$$\Delta d1 = \frac{c[\Delta(\phi b1) - (\phi c)]}{4\pi(fc)}$$

$$\Delta d1 = \frac{\lambda[\Delta(\phi b1) - (\phi c)]}{4\pi}$$

operation 465 omits phase difference ($\phi c$) and calculates the distance difference $\Delta d1$ as:

$$\Delta d1 = \frac{\lambda \Delta(\phi b1)}{4\pi}$$

This error can cause phase wrapping and an error of $$\frac{\lambda}{2}$$

in $\Delta d1$ for:

$$\sim d1 + n\frac{\lambda}{2}, n = 1, 2, \ldots$$

Where the radar system operates at a carrier frequency of 77 GHz, the phase wrapping error is approximately two millimeters. An error of two millimeters can be an unacceptable margin of error in some applications for the radar system. For example, orthodontic appliances must meet very fine specifications and the quality control threshold may be on the order of micrometers. A two millimeter error renders the radar system useless for quality control.

Figure 6:
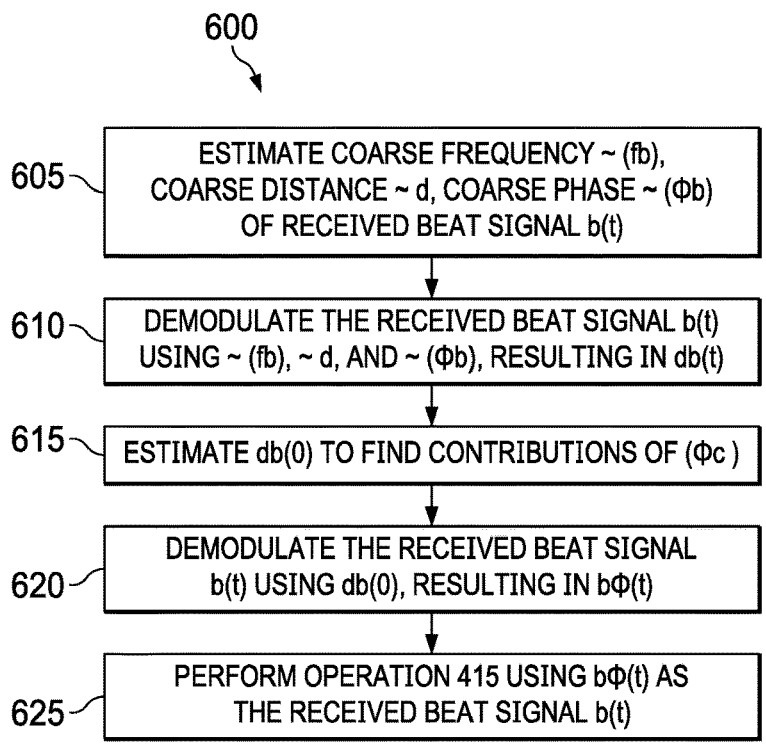
FIG. 6 illustrates, in flow chart form, an example method for compensating for the phase difference between received and reconstructed beat signals.

FIG. 6 illustrates, in flow chart form, an example method 600 for compensating for the phase difference between the received and the reconstructed beat signals, ($\phi c$). After operations 405 and 410 of example method 400 described herein with reference to FIG. 4 are performed and the radar system mixes the reflections off the target object and the spurious reflections with the transmitted chirp signal to obtain a beat signal b(t), the radar system estimates the coarse frequency, $\sim$(fb), coarse distance, $\sim$d, and coarse phase, $\sim$($\phi b$), of the received beat signal b(t) at operation 605. Example method 600 uses the coarse frequency and phase of the received beat signal b(t), including spurious reflections. However, in other examples, operation 415 is performed to remove spurious reflections and obtain modified beat signal b1(t). For these examples, the coarse frequency $\sim$(fb1), coarse distance $\sim$d1, and coarse phase $\sim$($\phi b1$) of the modified beat signal b1(t) are estimated at operation 605 instead. Using modified beat signal b1(t) may result in more accurate estimation of phase difference ($\phi c$), but at a higher computational cost.

At operation 610, $\sim$(fb) and $\sim$($\phi b$) are used to demodulate the received beat signal b(t), resulting in phase compensation signal db(t) which is represented as:

$$db(t) = b(t) * \hat{b}*(t) = e^{j[\Delta(fb)t + \Delta(\phi b) + (\phi c)]}$$

Operation 615 estimates the phase difference ($\phi c$) using the value of the phase compensation signal db(t) at time zero and assuming the value $\Delta(\phi b)$ is small:

$$db(0) \approx e^{j(\phi c)}$$

At operation 620, the received beat signal b(t) is demodulated using db(0) to compensate for the phase difference ($\phi c$), resulting in the phase compensated beat signal b$\phi$(t):

$$b\phi(t) = b(t) * db*(0)$$

The phase compensated beat signal b$\phi$(t) is then substituted for the received beat signal b(t) in operation 625, where the radar system performs operation 415 to remove spurious reflections from the phase compensated beat signal b$\phi$(t), resulting in modified beat signal b1(t). Then, the radar system returns to operation 435 of example method 400 and completes example method 400 using the modified beat signal b1(t) obtained from the phase compensated beat signal b$\phi$(t), rather than from the received beat signal b(t). Note that for radar systems that demodulate the received beat signal b(t) in operation 455, the phase compensated beat signal b$\phi$(t) is substituted for the received beat signal b(t) for demodulation using the coarse frequency $\sim$(fb1) and the coarse phase $\sim$($\phi b1$).

For some radar systems, the phase difference ($\phi c$) remains relatively stable while the system is in use, but fluctuates between one use and the next when the system is powered off and restarted. For these systems, operations 605-615 need only be performed to estimate db(0) once at the power up time: the same db(0) estimate can be used to eliminate the phase difference ($\phi c$) in all subsequent received beat signals. In these examples, the radar systems then perform a modified method 400, in which operations 620 and 625 are performed instead of operation 415. However, other radar systems experience fluctuations in the phase difference ($\phi c$) within a single use of the system. For these systems, the method 600 is performed in place of operation 415 at appropriate intervals to correct for the changing phase difference ($\phi c$). The appropriate intervals are chosen based on the requirements of the particular radar system and the purpose for which it is used. For example, the method 600 can be performed for every transmitted chirp signal or for the first transmitted chirp signal in each frame of a certain number of transmitted chirp signals.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Modifications are possible in the described embodiments, and other embodiments are possible, within the scope of the claims.

What is claimed is:

1. An integrated circuit comprising:
a receiver configured to determine a first beat signal based on received and transmitted radar signals;
a processor coupled to the receiver and configured to:
receive the first beat signal;
produce a second beat signal based on the first beat signal, wherein, to produce the second beat signal, the processor is configured to perform a Fourier transform on the first beat signal to produce a frequency domain representation of the first beat signal, determine a first frequency associated with the frequency domain representation of the first beat signal, and demodulate the first beat signal based on the first frequency;
determine a first distance for an object based on a second frequency associated with the second beat signal;
determine a first phase based on the first distance;
determine a second phase based on at least one of the first beat signal or the second beat signal; and
determine a second distance for the object based on the second phase.

2. The integrated circuit of claim 1, wherein:
the first distance is a coarse distance;
the second distance has relatively higher accuracy than the first distance;
the first phase is a coarse phase; and
the second phase has relatively higher accuracy than the first phase.

3. The integrated circuit of claim 1, wherein to produce the second beat signal, the processor is further configured to:
produce a first intermediate signal based on the demodulated first beat signal;
apply a low pass filter to the first intermediate signal to produce a second intermediate signal; and
modulate the second intermediate signal based on the first frequency to produce the second beat signal.

4. The integrated circuit of claim 1, wherein the processor is configured to determine the second phase by:
demodulating the at least one of the first beat signal or the second beat signal based on the second frequency associated with the second beat signal to produce an intermediate signal;
perform a line fit on the intermediate signal; and
determine the second phase based on the line fit.

5. The integrated circuit of claim 1, wherein the processor is configured to compensate for a phase shift of the first beat signal prior to filtering the first beat signal to produce the second beat signal.

6. The integrated circuit of claim 5, wherein the processor is configured to compensate for the phase shift of the first beat signal by:
determining an estimated phase difference; and
demodulating the first beat signal based on the estimated phase difference to produce a compensated first beat signal such that the filtering to produce the second beat signal is performed on the compensated first beat signal.

7. The integrated circuit of claim 1, further comprising a transmitter coupled to the receiver.

8. An integrated circuit comprising:
a receiver configured to determine a first beat signal based on received and transmitted radar signals;
a processor coupled to the receiver and configured to:
receive the first beat signal;
compensate for a phase shift of the first beat signal to generate a compensated first beat signal, including determine an estimated phase difference by:
determining a frequency and a phase of the first beat signal;
demodulating the first beat signal based on the frequency and the phase to produce an intermediate signal; and
determining the estimated phase difference as a value of the intermediate signal at a time zero;
filter the compensated first beat signal to produce a second beat signal;
determine a first distance for an object based on a frequency associated with the second beat signal;
determine a first phase based on the first distance;
determine a second phase based on at least one of the compensated first beat signal or the second beat signal; and
determine a second distance for the object based on the second phase.

9. An integrated circuit comprising:
a receiver configured to determine a first beat signal based on received and transmitted radar signals;
a processor coupled to the receiver and configured to:
receive the first beat signal;
perform compensation for a phase shift of the first beat signal to determine a second beat signal, including determine an estimated phase difference by determining a frequency and a phase of the first beat signal, and demodulating the first beat signal based on the frequency and the phase to produce an intermediate signal;
determine a first distance for an object based on a frequency associated with the second beat signal;
determine a first phase based on the first distance;
determine a second phase based on at least one of the first beat signal or the second beat signal; and
determine a second distance for the object based on the second phase.

10. The integrated circuit of claim 9, wherein the processor is further configured to compensate for the phase shift of the first beat signal by:
after determining the estimated phase difference,
demodulating the first beat signal based on the estimated phase difference to produce a compensated first beat signal such that the second beat signal is based on the compensated first beat signal.

11. The integrated circuit of claim 10, wherein the processor is configured to determine the estimated phase difference by:
determining the estimated phase difference as a value of the intermediate signal at a time zero.

12. The integrated circuit of claim 9, further comprising a transmitter coupled to the receiver.

13. A non-transitory computer-readable storage device storing instructions that, when executed by at least one processor core, cause the at least one processor core to:
receive a first beat signal corresponding to a reflected radar signal associated with an object;
produce a second beat signal based on the first beat signal, in which the instructions, when executed by the at least one processor core, cause the at least one processor core to perform a Fourier transform on the first beat signal to produce a frequency domain representation of the first beat signal, determine a first frequency associated with the frequency domain representation of the first beat signal, and demodulate the first beat signal based on the first frequency to produce a first intermediate signal;

determine a first distance for the object based on a second frequency associated with the second beat signal;

determine a first phase based on the first distance;

determine a second phase based on at least one of the first beat signal or the second beat signal; and determine a second distance for the object based on the second phase.

14. The non-transitory computer-readable storage device of claim 13, wherein:

the first distance is a coarse distance;

the second distance has relatively higher accuracy than the first distance;

the first phase is a coarse phase; and the second phase has relatively higher accuracy than the first phase.

15. The non-transitory computer-readable storage device of claim 13, wherein:

the instructions to produce the second beat signal include instructions that cause the at least one processor core to:

apply a low pass filter to the first intermediate signal to produce a second intermediate signal; and modulate the second intermediate signal based on the second frequency to produce the second beat signal.

16. The non-transitory computer-readable storage device of claim 13, wherein the instructions to determine the second phase include instructions that cause the at least one processor core to:

demodulate the at least one of the first beat signal or the second beat signal based on the second frequency associated with the second beat signal to produce an intermediate signal;

perform a line fit on the intermediate signal; and determine the second phase based on the line fit.

17. The non-transitory computer-readable storage device of claim 13 storing further instructions to cause the at least one processor core to compensate for a phase shift of the first beat signal prior to filtering the first beat signal to produce the second beat signal.

18. The non-transitory computer-readable storage device of claim 17, wherein the instructions to compensate for the phase shift of the first beat signal prior include instructions that cause the at least one processor core to:

determine an estimated phase difference; and demodulate the first beat signal based on the estimated phase difference to produce a compensated first beat signal such that the filtering to produce the second beat signal is performed on the compensated first beat signal.

19. The non-transitory computer-readable storage device of claim 18, wherein the instructions to determine the estimated phase difference include instructions that cause the at least one processor core to:

determine a third frequency and a phase of the first beat signal;

demodulate the first beat signal based on the third frequency and the phase to produce an intermediate signal; and determine the estimated phase difference as a value of the intermediate signal at a time zero.

20. The non-transitory computer-readable storage device of claim 13 storing further instructions to cause the at least one processor core to cause a transmitter to provide a set of frequency modulated continuous wave chirps such that the reflected radar signal is in response to the set of frequency modulated continuous wave chirps.

* * * * *